United States Patent
Tang

(10) Patent No.: US 9,835,819 B2
(45) Date of Patent: Dec. 5, 2017

(54) SIGHT ADJUSTABLE BY SINGLE HAND

(71) Applicants: Sintai Optical (Shenzhen) Co., Ltd., Shenzhen, Guangdong Province (CN); Asia Optical International Ltd., Taichung (TW)

(72) Inventor: Chia-Chi Tang, Taichung (TW)

(73) Assignees: SINTAI OPTICAL (SHENZHEN) CO., LTD., Taichung (TW); ASIA OPTICAL INTERNATIONAL LTD., Taichung (TW)

( * ) Notice: Subject to any disclaimer, the term of this patent is extended or adjusted under 35 U.S.C. 154(b) by 0 days.

(21) Appl. No.: 14/998,657

(22) Filed: Jan. 28, 2016

(65) Prior Publication Data
US 2016/0231554 A1   Aug. 11, 2016

(30) Foreign Application Priority Data
Feb. 10, 2015   (TW) .............................. 104104341 A

(51) Int. Cl.
G02B 23/00 (2006.01)
G02B 7/04 (2006.01)
G02B 23/14 (2006.01)
F41G 1/38 (2006.01)

(52) U.S. Cl.
CPC ................. G02B 7/04 (2013.01); F41G 1/38 (2013.01); G02B 23/14 (2013.01)

(58) Field of Classification Search
CPC .............. G02B 7/04; G02B 23/14; F41G 1/38
USPC ............................. 359/425, 429; 42/119, 122
See application file for complete search history.

(56) References Cited

U.S. PATENT DOCUMENTS

| | | | | |
|---|---|---|---|---|
| 4,643,542 A * | 2/1987 | Gibson | ..................... | F41G 1/38 359/424 |
| 5,276,554 A * | 1/1994 | Nassivera | ................ | G02B 7/10 359/694 |
| 6,005,711 A * | 12/1999 | Mai | .......................... | G02B 7/10 359/399 |
| 6,598,332 B1 * | 7/2003 | Jibiki | ........................ | F41G 1/38 42/119 |
| 8,314,994 B1 * | 11/2012 | Thomas | ............... | G02B 23/145 359/676 |
| 2002/0089742 A1 * | 7/2002 | Otteman | ................ | G02B 7/027 359/423 |
| 2006/0254115 A1 * | 11/2006 | Thomas | .................... | F41G 1/38 42/122 |
| 2011/0242650 A1 * | 10/2011 | Windauer | ................. | F41G 1/44 359/428 |

(Continued)

Primary Examiner — Frank Font
(74) Attorney, Agent, or Firm — McClure, Qualey & Rodack, LLP

(57) ABSTRACT

A sight includes a main body including a focus lens system and an erecting lens system; a first adjusting member disposed in the main body and configured to move the focus lens system along the optical axis; a second adjusting member disposed in the main body and configured to move the erecting lens system in a first direction which is perpendicular to the optical axis; a focus adjusting module disposed in the main body and configured to drive the first adjusting member so as to move the focus lens system along the optical axis; and a first adjusting module detachably joined to the focus adjusting module and configured to drive the second adjusting member so as to move the erecting lens system in the first direction.

20 Claims, 10 Drawing Sheets

(56) References Cited

U.S. PATENT DOCUMENTS

2015/0247702 A1\* 9/2015 Davidson .................. F41G 1/38
                                                          42/122

\* cited by examiner

SIGHT ADJUSTABLE BY SINGLE HAND

BACKGROUND OF THE INVENTION

Field of the Invention

The invention relates to a sight, and more particularly to a sight in which a first adjusting module is integrated with a focus adjusting module, whereby a user can perform focus adjustment and elevation adjustment with a single hand.

Description of the Related Art

Referring to FIG. 1, a conventional sight 1000 includes a main body 200, a focus adjusting module 400, an elevation adjusting module 600 and a windage adjusting module 800. The main body 200 can be mounted to a weapon such as a rifle. The focus adjusting module 400 is disposed on a left side of the main body 200. The elevation adjusting module 600 is disposed on a top side of the main body 200. The windage adjusting module 800 is disposed on a right side of the main body 200.

When using the conventional sight 1000 for shooting, a user must operate the focus adjusting module 400 through his/her left hand for focus adjustment, and afterwards operate the elevation adjusting module 600 and the windage adjusting module 800 through his/her right hand for elevation adjustment and windage adjustment of impact points. Such operation is inconvenient and takes time for aiming.

BRIEF SUMMARY OF THE INVENTION

An object of the invention is to provide a sight in which a first adjusting module is integrated with a focus adjusting module, whereby a user can operate the focus adjust mechanism and the elevation adjust mechanism through a single hand (the right hand or the left hand) for focus adjustment and elevation adjustment.

The sight in accordance with an exemplary embodiment of the invention includes a main body including a focus lens system and an erecting lens system; a first adjusting member disposed in the main body and configured to move the focus lens system along the optical axis; a second adjusting member disposed in the main body and configured to move the erecting lens system in a first direction which is perpendicular to the optical axis; a focus adjusting module disposed in the main body and configured to drive the first adjusting member so as to move the focus lens system along the optical axis; and a first adjusting module detachably joined to the focus adjusting module and configured to drive the second adjusting member so as to move the erecting lens system in the first direction.

In another exemplary embodiment, the sight further includes a third adjusting member disposed in the main body and configured to move the erecting lens system in a second direction which is perpendicular to the optical axis and first direction; and a second adjusting module disposed in the main body and configured to drive the third adjusting member so as to move the erecting lens system in the second direction.

In yet another exemplary embodiment, the first adjusting module is an elevation adjusting module, and the second adjusting module is a windage adjusting module.

In another exemplary embodiment, the first adjusting module is a windage adjusting module, and the second adjusting module is an elevation adjusting module.

In yet another exemplary embodiment, the first adjusting module is an elevation adjusting module.

In another exemplary embodiment, the first adjusting module is a windage adjusting module.

In yet another exemplary embodiment, the focus module includes a first base fixed to the main body and a connecting member fixed to the first base. The first adjusting module includes a second base detachably joined to the connecting member. The first adjusting member and the second adjusting members are movably disposed on the first base.

In another exemplary embodiment, the connecting member includes a hole, and the second base is detachably joined to the connecting member by screwing the second base to the hole.

In yet another exemplary embodiment, the first adjusting module includes a fourth adjusting member movably disposed on the second base and extending through the hole to abut the second adjusting member, and the fourth adjusting member is configured to move the second adjusting member.

In another exemplary embodiment, the first adjusting module includes a third adjusting member movably disposed on the second base and extending through the hole to abut the second adjusting member, and the third adjusting member is configured to move the second adjusting member.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
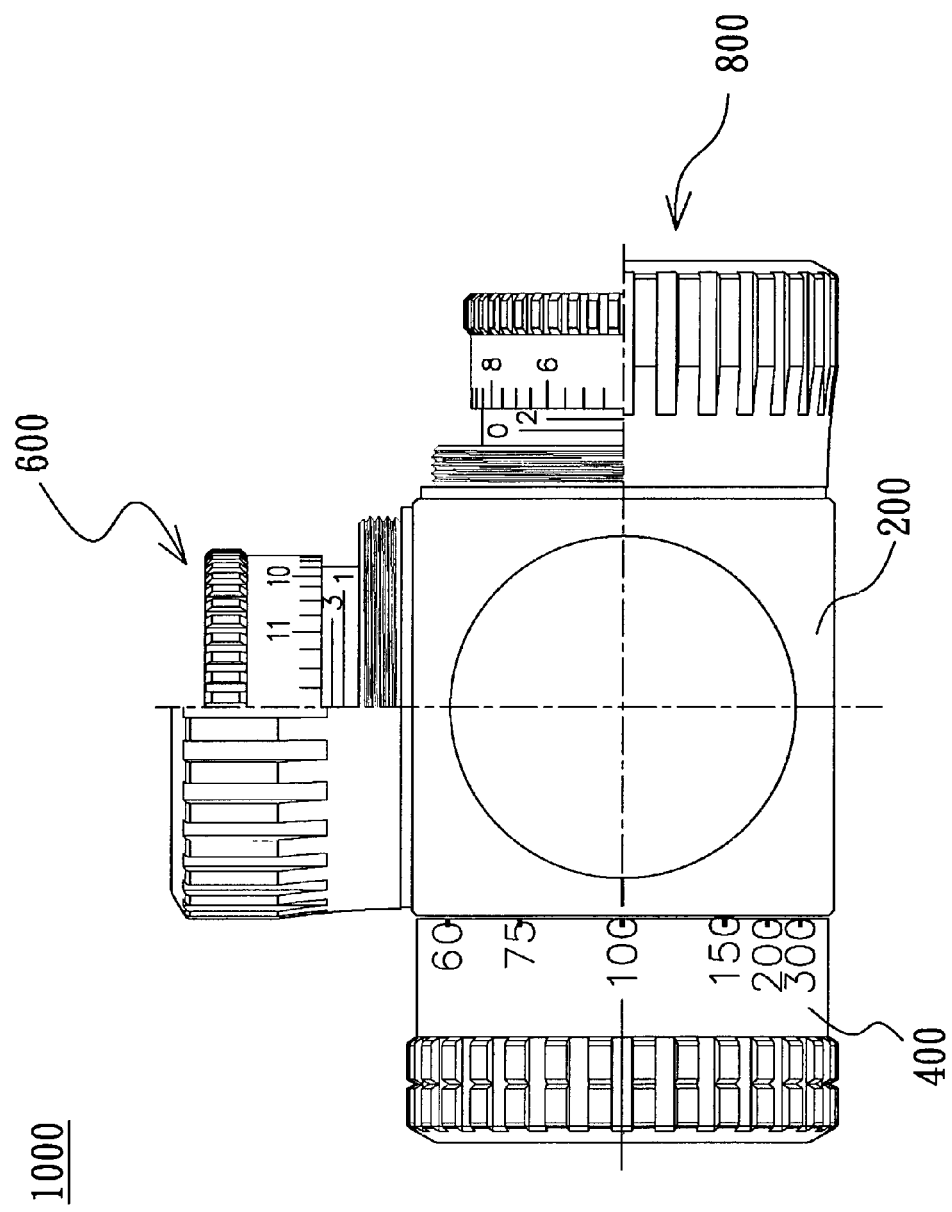
FIG. 1 is a schematic view of a conventional sight.
Figure 2A:
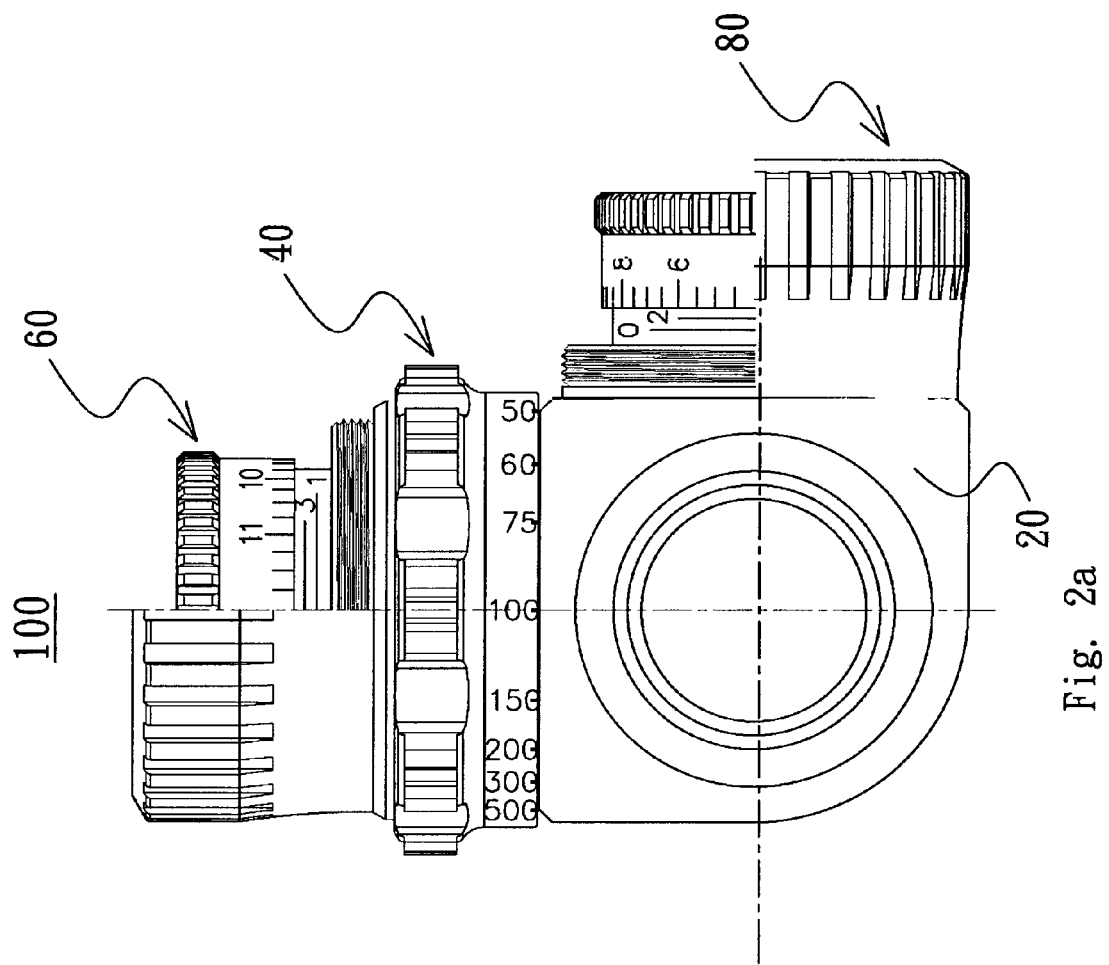
FIG. 2*a* is a schematic view of an embodiment of a sight of the invention.
Figure 2B:
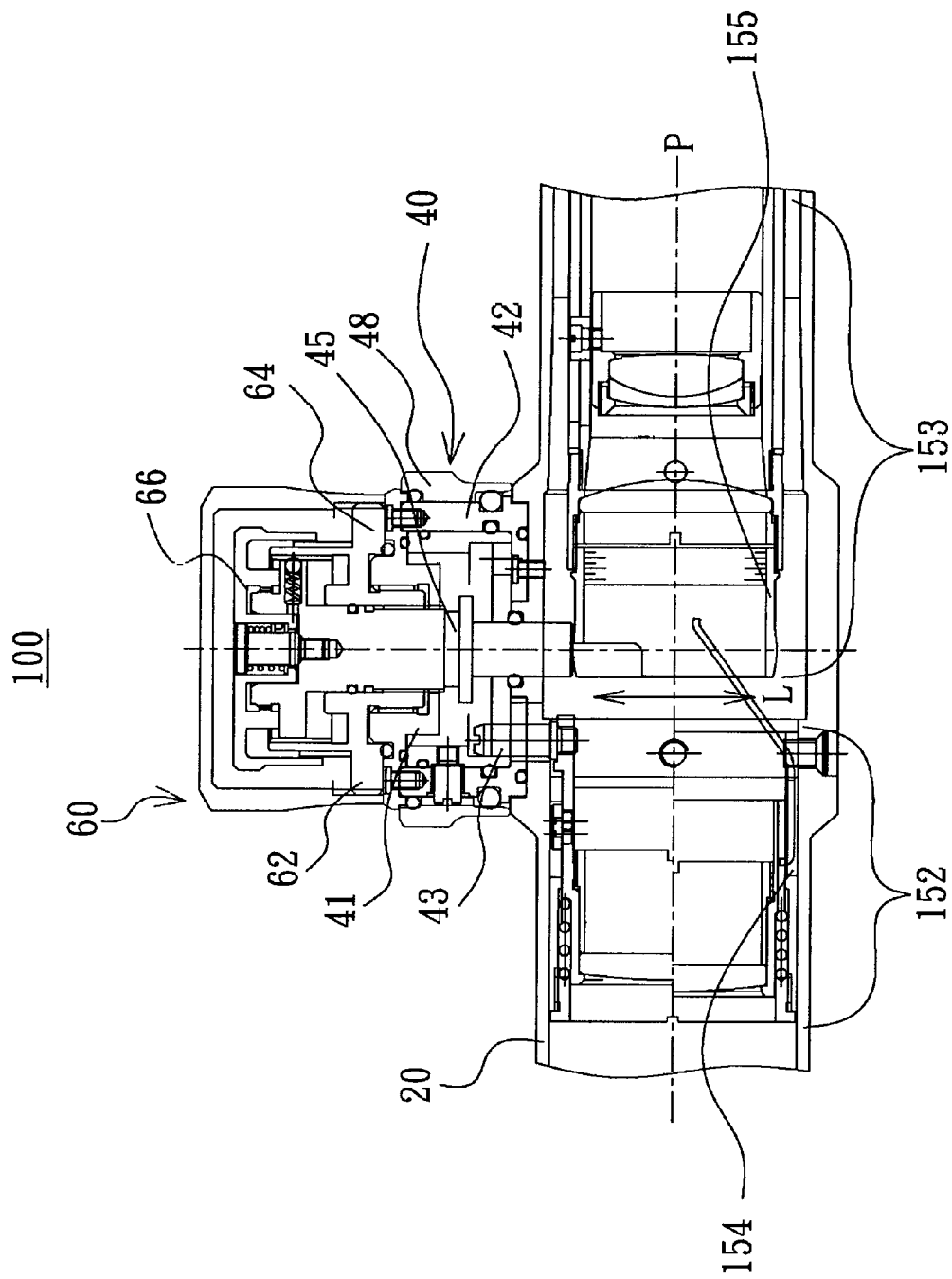
FIG. 2*b* is a cross section of the sight of FIG. 2*a* viewed from a right-hand side of the sight.

Referring to FIGS. 2*a* and 2*b*, a sight 100 of the invention includes a main body 20, a focus adjusting module 40, a first adjusting module 60, a second adjusting module 80, a first adjusting member 43, a second adjusting member 45 and a third adjusting member 84. The main body 20 is hollow and includes a focus lens system 152 for focus adjustment and an erecting lens system 153 for impact point adjustment. The focus adjusting module 40 is disposed in the main body 20 and configured to move the focus lens system 152 for focus adjustment, and the first adjusting module 60 is disposed on the focus adjusting module 40 and configured to move the erecting lens system 153 for adjustment of impact points. In this embodiment, the first adjusting module 60 is mounted to the focus adjusting module 40 and integrated with the focus adjusting module 40. The second adjusting module 80 is disposed in the main body 20 and configured to move the erecting lens system 153 for adjustment of impact points. In this embodiment, the first adjusting module 60 is an elevation adjusting module, and the second adjusting module 80 is a windage adjusting module.

Figure 3A:
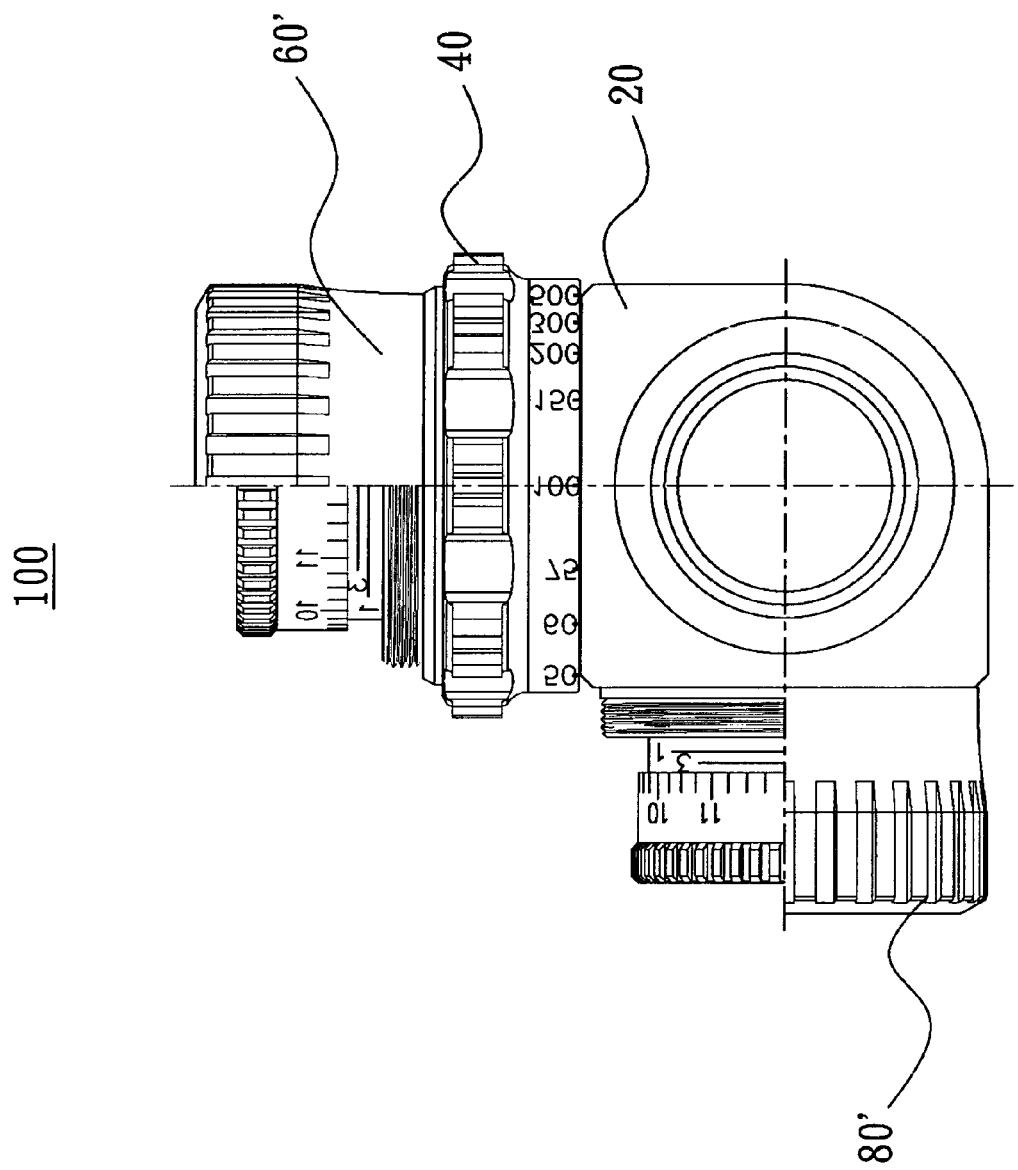
FIG. 3*a* is a schematic view of another embodiment of a sight of the invention.
Figure 3B:
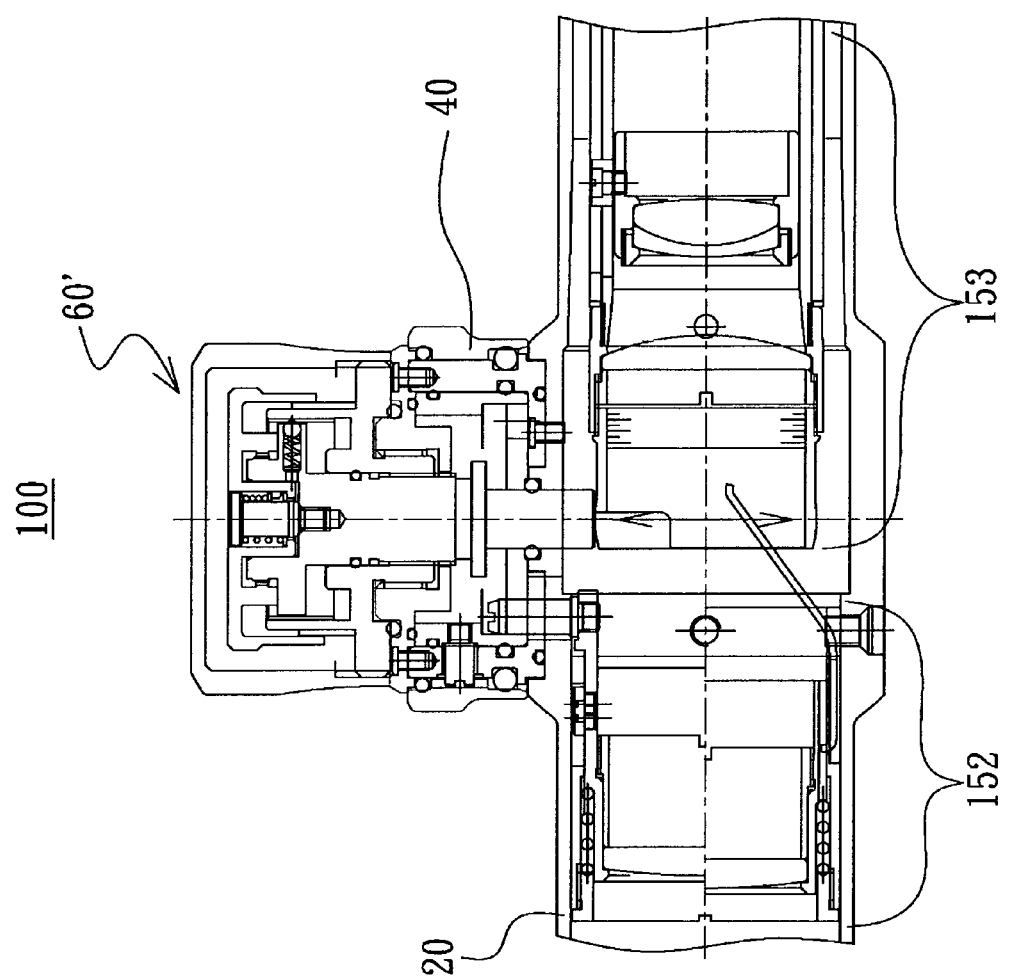
FIG. 3*b* is a cross section of the sight of FIG. 3*a* viewed from a left-hand side of the sight.

Referring to FIGS. 3a and 3b, another embodiment of a sight of the invention is shown. In this embodiment, the focus adjusting module 40 is disposed in the main body 20, the first adjusting module 60' is mounted to the focus adjusting module 40 and integrated with the focus adjusting module 40, and the second adjusting module 80' is disposed in the main body 20. The focus adjusting module 40 is configured to move the focus lens system 152 for focus adjustment, and the first adjusting module 60' and the second adjusting module 80' are configured to move the erecting lens system 153 for adjustment of impact points. In this embodiment, the first adjusting module 60' is a windage adjusting module, and the second adjusting module 80' is an elevation adjusting module.

Figure 4:
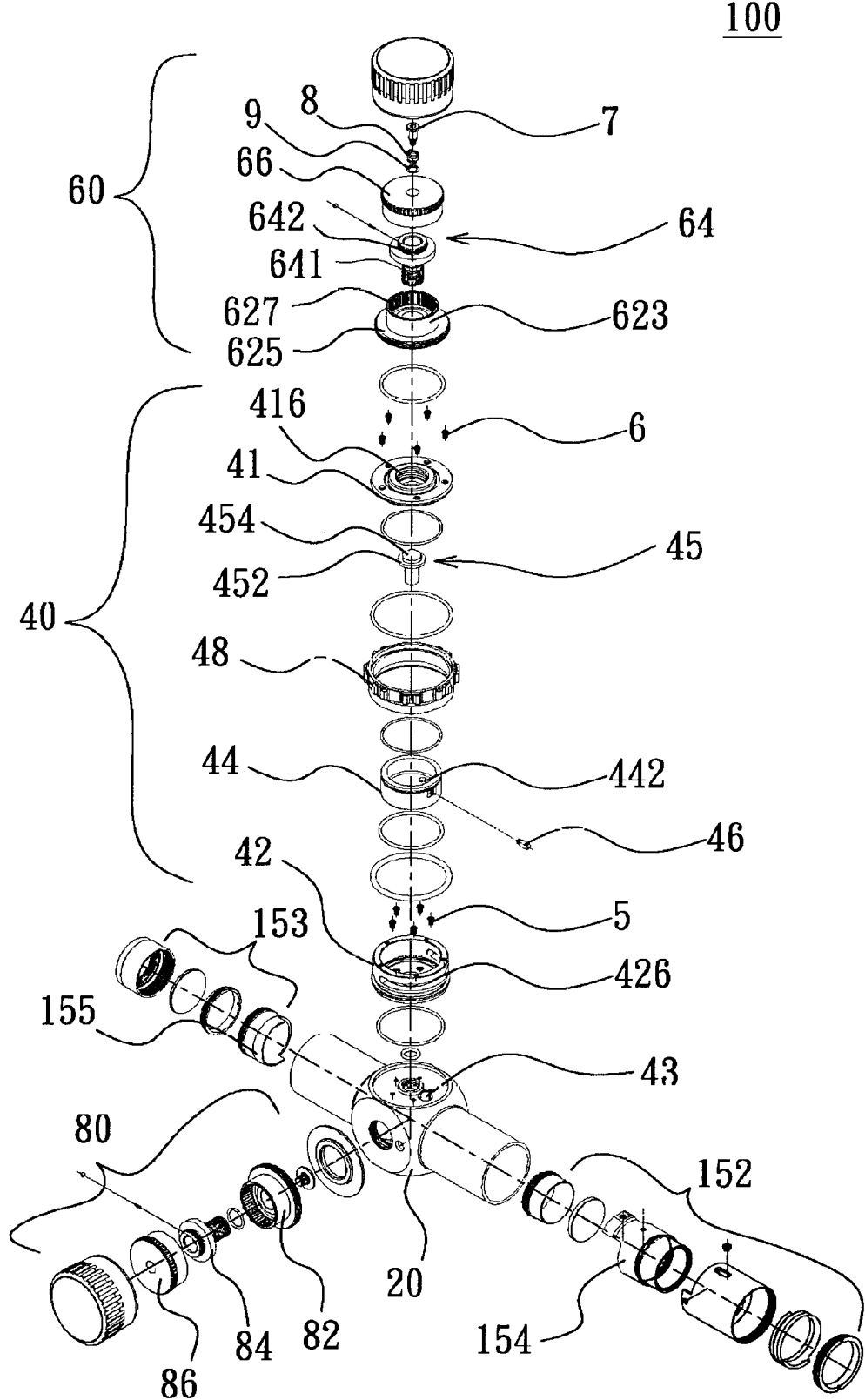
FIG. 4 is an exploded view of an embodiment of a sight of the invention.
Figure 5A:
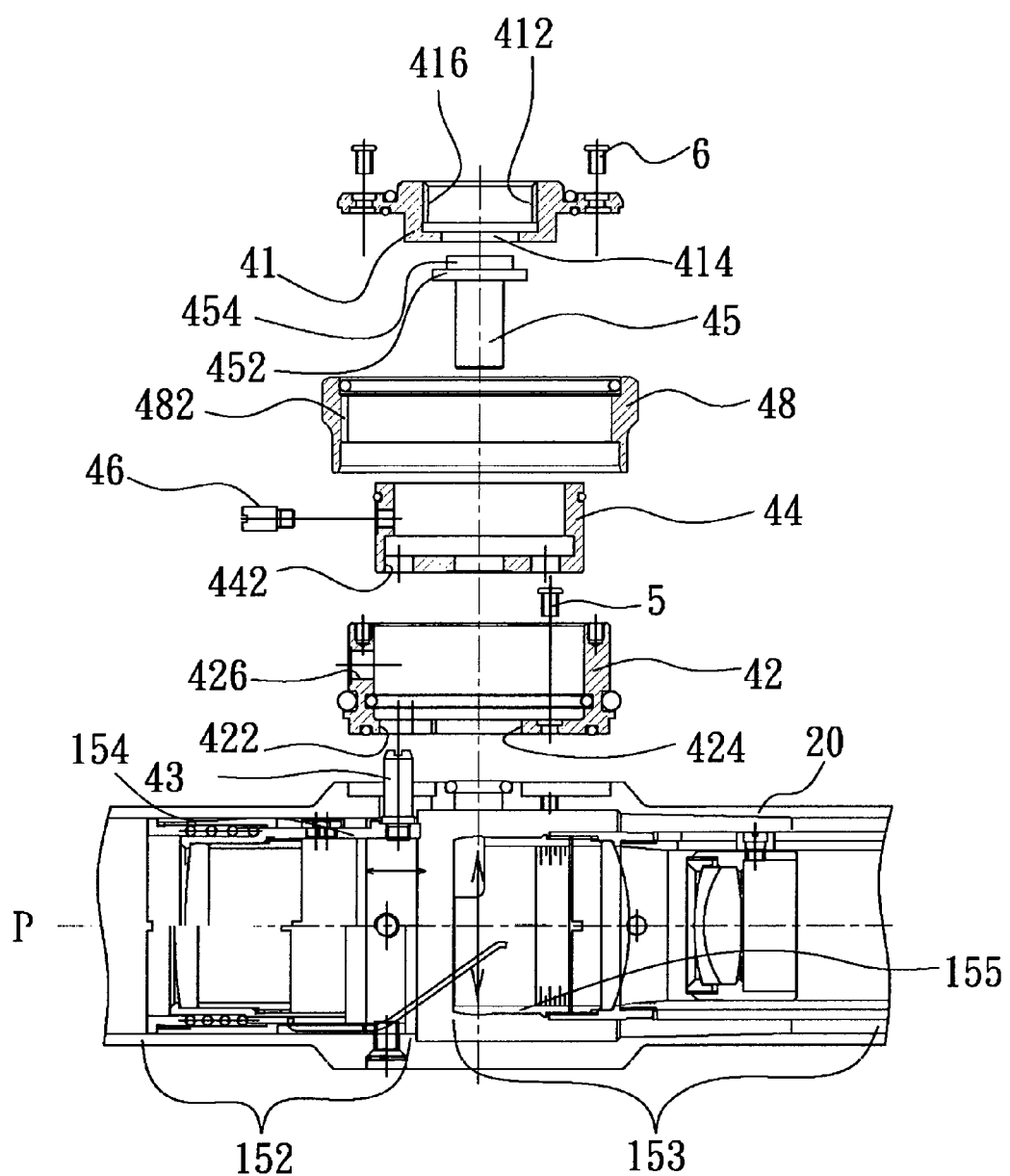
FIG. 5*a* is an exploded view of a focus adjusting module of the sight of FIG. 2*b*.
Figure 5B:
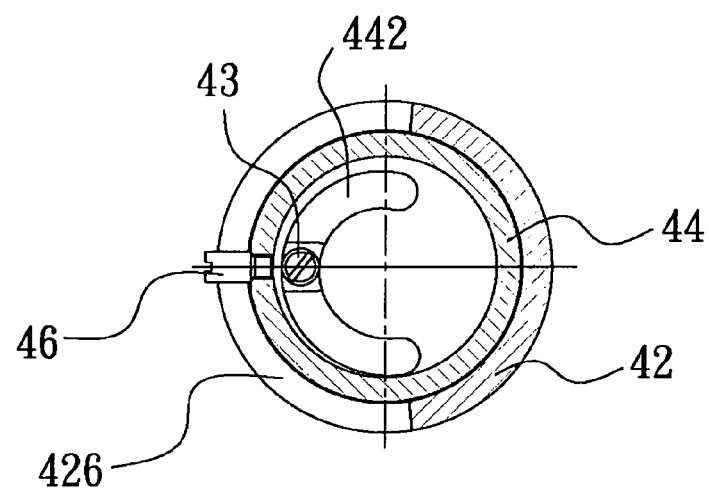
FIG. 5*b* is a top view of FIG. 5*a*.
Figure 5C:
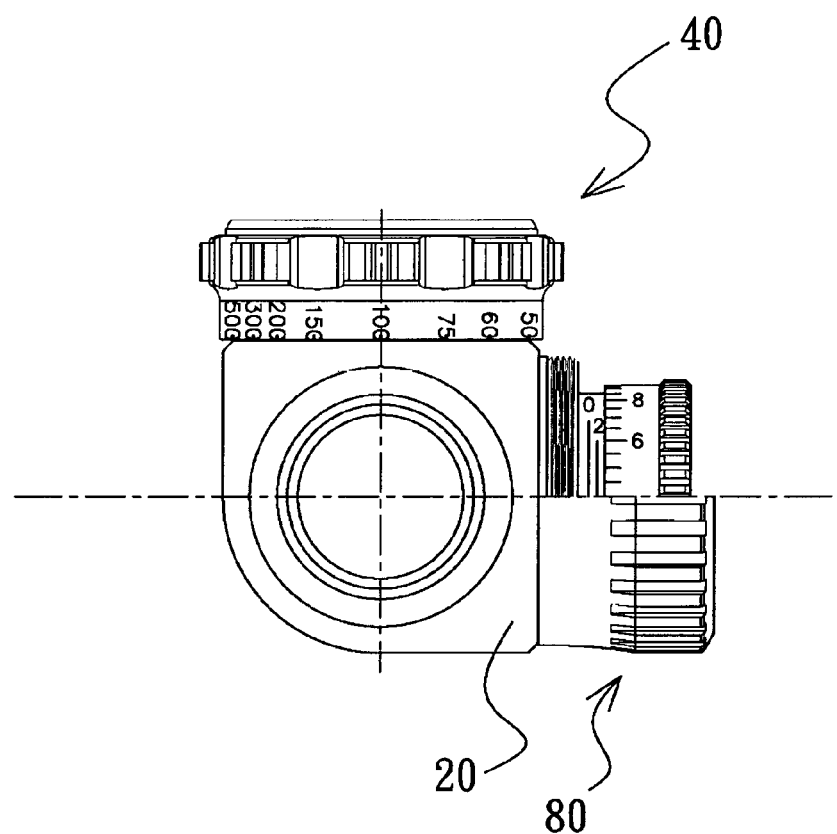
FIG. 5*c* depicts the sight of FIG. 2*a*, wherein a first adjusting module is removed.

From the above descriptions, it is understood that the focus adjusting module 40 can be integrated with the elevation adjusting module or the windage adjusting module. Generally, the elevation adjusting module is disposed on the top of the sight, and the windage adjusting module is disposed on the right side of the sight. Therefore, a user can operate the focus adjusting module, the elevation adjusting module and the windage adjusting module by only the right hand, no matter which module (the elevation adjusting module or the windage adjusting module) is integrated with the focus adjusting module 40. The structure of sight of the invention is described in detail as follows. Referring to FIGS. 2b, 4 and 5a, the focus adjusting module 40 of the invention includes a first base 42, a cam 44, a constraining bolt 46, a focus adjusting knob 48 and a connecting member 41. The first base 42 is fixed to the main body 20 through several bolts 5 and includes a through hole 422 and a central hole 424. The first adjusting member 43 is cylindrical and joined to the lens barrel 154 of the focus lens system 152 through the through hole 422. The second adjusting member 45 is also cylindrical and extends through the central hole 424 and the main body 20 to move the lens barrel 155 of the erecting lens system 153 in a first direction L which is perpendicular to the optical axis P. The cam 44 is rotatably disposed in the first base 42 and has a cam groove 442 formed on a bottom of the cam 44. The constraining bolt 46 extends through an arced groove 426 formed on the first base 42 and is fixed to a peripheral wall of the cam 44. The focus adjusting knob 48 is fitted to an outer peripheral wall of the first base 42 and has a constraining portion 482 configured to constrain the constraining bolt 46. When the focus adjusting knob 48 is rotated, the constraining portion 482 is rotated to push the constraining bolt 46 so as to rotate the cam 44. As shown in FIG. 5b, the cam groove 422 is arced and has two ends. One end is closer to a rotational center O and the other end is farther from the rotational center O. The cam groove 442 corresponds to the through hole 422, and the first adjusting member 43 extends through the cam groove 442 and the through hole 422 to push the cam 44. When the cam 44 rotates, the cam groove 442 is rotated and drives the first adjusting member 43 to approach or depart from the rotational center O, and the first adjusting member 43 is moved forwards or backwards along an optical axis P of the focus lens system 152, thereby performing the focus adjustment.

Referring to FIGS. 2b, 4 and 5a, the connecting member 41 is fixed to the first base 42 through several bolts 6. The connecting member 41 has a screw hole 412 and a through hole 414. The screw hole 412 has a first female thread portion 416. The second adjusting member 45 includes a flange 452 and a head 454. The flange 452 is against a bottom of the connecting member 41, and the head 454 is fitted to the through hole 414 to form a limiting structure.

Figure 6A:
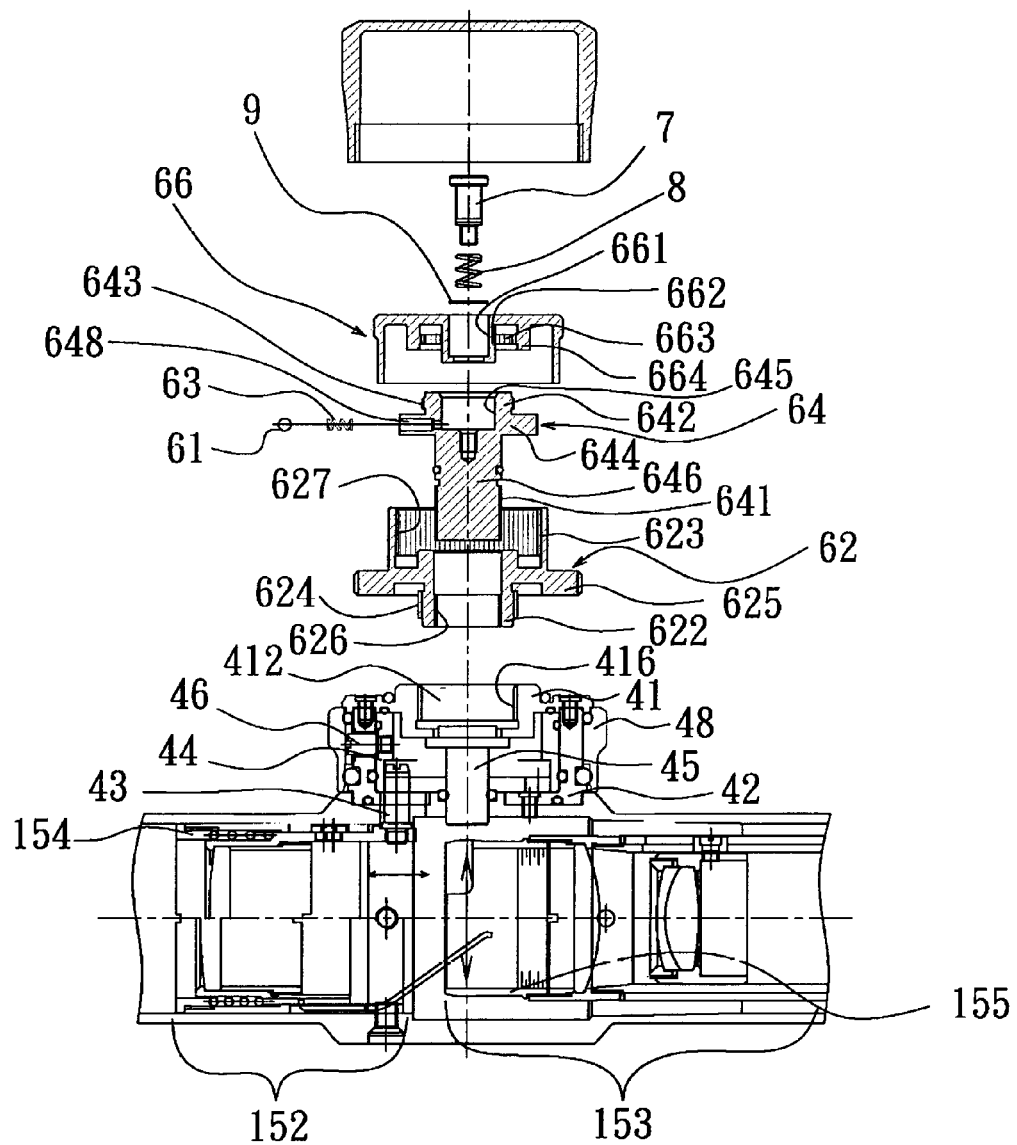
FIG. 6*a* is an exploded view of a first adjusting module of the sight of FIG. 2*b*.
Figure 6B:
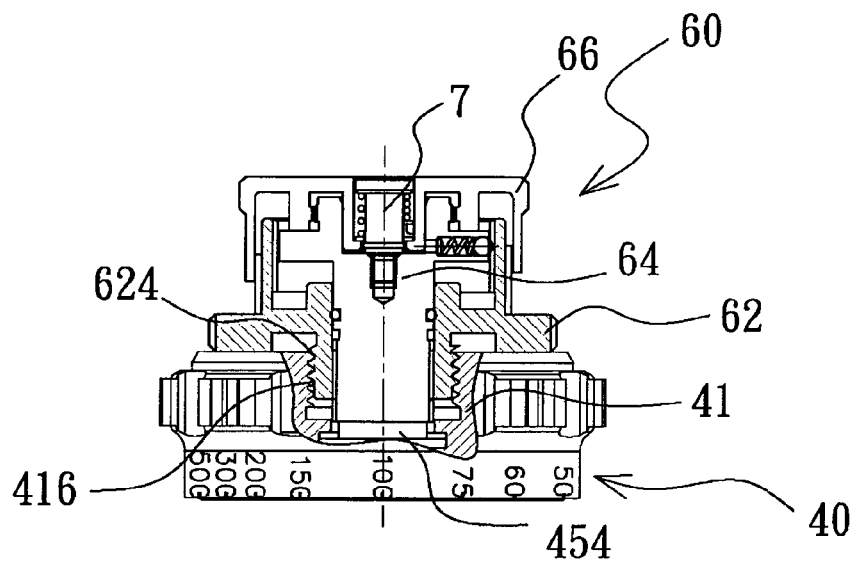
FIG. 6*b* is a cross section of the first adjusting module of FIG. 2*b*.
Figure 6C:
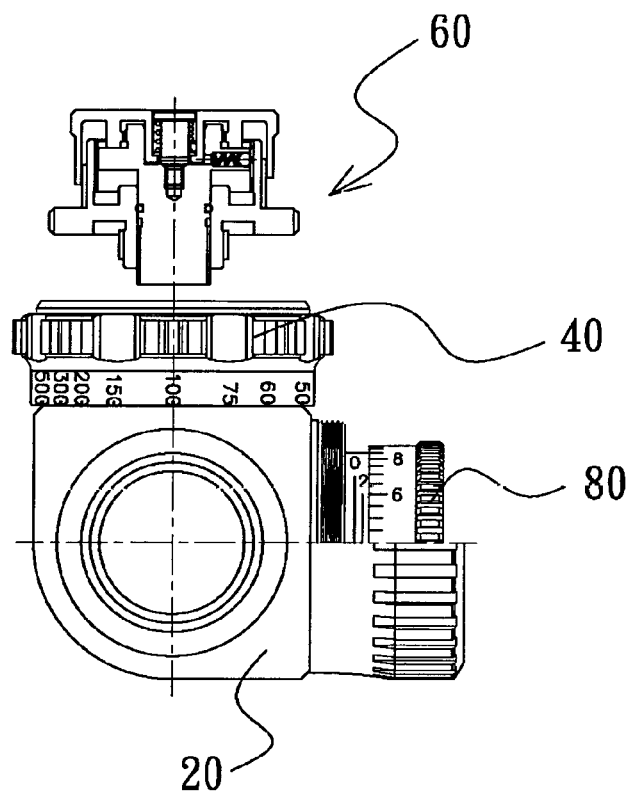
FIG. 6*c* depicts the first adjusting module separated from the sight of FIG. 2*a*.

Referring to FIGS. 6a-6c, the first adjusting module 60 includes a second base 62, a fourth adjusting member 64 and a first adjusting knob 66. The second base 62 is tubular and has a first sleeve portion 622, a second sleeve portion 623 and a flange 625. The first sleeve portion 622 and the second sleeve portion 623 are connected to the flange 625 and extend in opposite directions from the flange 625. A male thread portion 624 is formed on an outer peripheral wall of the first sleeve portion 622, and a second female thread portion 626 is formed on an inner peripheral wall of the first sleeve portion 622. A plurality of positioning grooves 627 extending axially are formed on an inner wall of the second sleeve portion 623. The fourth adjusting member 64 is cylindrical and includes a head 642, a flange 644 and a post 646. A second male thread portion 641 is formed on an outer periphery of the post 646. A blind hole 648 is formed on an outer peripheral wall of the flange 644 to receive a positioning ball 61 and a spring 63. A plurality of teeth 643 are formed on an outer periphery of the head 642 and a depressed portion 645 is formed on a top of the head 642. The first adjusting knob 66 is tubular and includes a first annular portion 662 and a second annular portion 664. A through hole 661 is formed on the first annular portion 662 and a plurality of teeth 663 are formed on an inner peripheral wall of the second annular portion 664.

The first annular portion 662 is joined to the depressed portion 645. The first adjusting knob 66 is fixed to the fourth adjusting member 64 through a bolt 7, a spring 8 and a fasten ring 9. When the first adjusting knob 66 is assembled with the fourth adjusting member 64, the teeth 663 engage the teeth 643. The second male thread portion 641 of the fourth adjusting member 64 screws to the second female thread portion 626 of the second base 62 so that the positioning ball 61 engages the positioning grooves 627. When the first adjusting knob 66 is rotated, the first adjusting knob 66 rotates fourth adjusting member 64 so that the fourth adjusting member 64 moves along the second sleeve portion 622 of the second base 62 upwards and downwards and can be positioned in any position by the positioning ball 61.

The first adjusting module 60 is joined to the focus adjusting module 40 by screwing the first male thread portion 624 of the first sleeve portion 622 to the first female thread portion 416 of the connecting member 41. Since the fourth adjusting member 64 can move along the second sleeve portion 622 upwards and downwards, the fourth adjusting member 64 extends through the through hole 414 to push the second adjusting member 45 when the second base 62 is joined to the connecting member 41. When the first adjusting knob 66 is rotated, the second adjusting member 45 is pushed by the fourth adjusting member 64 to move the lens barrel 155 of the erecting lens system 153 for adjustment of impact points.

The second adjusting module 80 has a structure similar to the first adjusting module 60. Referring to FIG. 4 again, the second adjusting module 80 includes a third base 82 and a second adjusting knob 86. The third base 82 is fixed to the main body 20, the third adjusting member 84 is screwed to the third base 82 and movable in the third base 82, and the second adjusting knob 86 is joined to the third adjusting member 84. When the second adjusting knob 86 is rotated, the third adjusting member 84 is moved by the second adjusting knob 86 so as to move the lens barrel 155 of the erecting lens system 153 in a second direction which is perpendicular to the optical axis P and the first direction L for adjustment of impact points.

As the first adjusting module 60 of the sight of the invention is integrated with the focus adjusting module 40, users can operate the sight to adjust focus and impact points by a single hand. In addition, since the first adjusting module 60 is joined to the focus adjusting module 40 by screwing the second base 62 to the connecting member 41, the first adjusting module 60 is detachable and replaceable. Therefore, users can select different adjusting modules according to various kinds of weapon or different shooting requirements, such as Zero Reset, m-223, Tectical Competition, Hunter etc. In addition, the second adjusting member 45 can be moved by the fourth adjusting member 64 for adjustment of impact points when the first adjusting module 60 is joined to the focus adjusting module 40 and can also serve as a plug for preventing gas leakage when the first adjusting module 60 is removed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sight having an optical axis, comprising:
   a main body comprising a focus lens system and an erecting lens system;
   a first adjusting member disposed in the main body and configured to move the focus lens system along the optical axis;
   a second adjusting member disposed in the main body and configured to move the erecting lens system in a first direction which is perpendicular to the optical axis; and
   a focus adjusting module disposed in the main body and configured to drive the first adjusting member so as to move the focus lens system along the optical axis;
   wherein the focus adjusting module comprises a first base fixed to the main body and a connecting member fixed to the first base, and a second base detachably joined to the connecting member.

2. The sight as claimed in claim 1, further comprising a first adjusting module detachably joined to the focus adjusting module by the second base and configured to drive the second adjusting member so as to move the erecting lens system in the first direction.

3. The sight as claimed in claim 2, wherein the connecting member comprises a hole, and the second base is detachably joined to the connecting member by screwing the second base to the hole.

4. The sight as claimed in claim 3, wherein the first adjusting module comprises a fourth adjusting member movably disposed on the second base and extending through the hole to abut the second adjusting member, and the fourth adjusting member is configured to move the second adjusting member.

5. The sight as claimed in claim 2, wherein the first adjusting module comprises a third adjusting member movably disposed on the second base and extending through the connecting member to abut the second adjusting member, and the third adjusting member is configured to move the second adjusting member.

6. The sight as claimed in claim 2, further comprising
   a third adjusting member disposed in the main body and configured to move the erecting lens system in a second direction which is perpendicular to the optical axis and first direction; and
   a second adjusting module disposed in the main body and configured to drive the third adjusting member so as to move the erecting lens system in the second direction.

7. The sight as claimed in claim 6, wherein the first adjusting module is an elevation adjusting module, and the second adjusting module is a windage adjusting module.

8. The sight as claimed in claim 6, wherein the first adjusting module is a windage adjusting module, and the second adjusting module is an elevation adjusting module.

9. The sight as claimed in claim 2, wherein the first adjusting module is an elevation adjusting module.

10. The sight as claimed in claim 2, wherein the first adjusting module is a windage adjusting module.

11. The sight as claimed in claim 1, wherein the first adjusting member and the second adjusting members are movably disposed on the first base.

12. A sight having an optical axis, comprising:
    a main body comprising a focus lens system and an erecting lens system;
    a first adjusting member disposed in the main body and configured to move the focus lens system along the optical axis;
    a second adjusting member disposed in the main body and configured to move the erecting lens system in a first direction which is perpendicular to the optical axis;
    a focus adjusting module disposed in the main body and configured to drive the first adjusting member so as to move the focus lens system along the optical axis; and
    a first adjusting module detachably joined to the focus adjusting module and configured to drive the second adjusting member so as to move the erecting lens system in the first direction;
    wherein the focus adjusting module comprises a first base fixed to the main body and a connecting member fixed to the first base, the first adjusting module comprises a second base detachably joined to the connecting member, and the first adjusting member and the second adjusting members are movably disposed on the first base.

13. The sight as claimed in claim 12 further comprising
    a third adjusting member disposed in the main body and configured to move the erecting lens system in a second direction which is perpendicular to the optical axis and first direction; and
    a second adjusting module disposed in the main body and configured to drive the third adjusting member so as to move the erecting lens system in the second direction.

14. The sight as claimed in claim 13, wherein the first adjusting module is an elevation adjusting module, and the second adjusting module is a windage adjusting module.

15. The sight as claimed in claim 13, wherein the first adjusting module is a windage adjusting module, and the second adjusting module is an elevation adjusting module.

16. The sight as claimed in claim 12, wherein the first adjusting module is an elevation adjusting module.

17. The sight as claimed in claim 12, wherein the first adjusting module is a windage adjusting module.

18. The sight as claimed in claim 12, wherein the connecting member comprises a hole, and the second base is detachably joined to the connecting member by screwing the second base to the hole.

19. The sight as claimed in claim 18, wherein the first adjusting module comprises a fourth adjusting member movably disposed on the second base and extending through the hole to abut the second adjusting member, and the fourth adjusting member is configured to move the second adjusting member.

20. The sight as claimed in claim 12, wherein the first adjusting module comprises a third adjusting member movably disposed on the second base and extending through the connecting member to abut the second adjusting member, and the third adjusting member is configured to move the second adjusting member.

* * * * *